United States Patent [19]

Barbier

[11] 4,011,924

[45] Mar. 15, 1977

[54] DEVICE FOR PRODUCING MECHANICAL WAVES

[75] Inventor: Maurice Barbier, Ousse, France

[73] Assignee: Societe Nationale des Petroles d'Aquitaine, Paris, France

[22] Filed: Oct. 1, 1974

[21] Appl. No.: 511,013

[30] Foreign Application Priority Data

Oct. 15, 1973 France .................. 73.37807

[52] U.S. Cl. .................. 181/121; 181/114; 181/119; 340/17 R
[51] Int. Cl.² .................. G01V 1/14
[58] Field of Search .......... 181/121, 114, 113, 117, 181/119; 73/71.6; 324/83 FE, 83 FM; 340/17; 175/1

[56] References Cited

UNITED STATES PATENTS

| 2,675,086 | 4/1954 | Clewell | 181/121 |
| 3,130,809 | 4/1964 | Flatow | 181/121 |
| 3,209,854 | 10/1965 | Williams | 181/121 |
| 3,288,244 | 11/1966 | Kirby | 181/114 |
| 3,363,720 | 1/1968 | Mifsud et al. | 181/114 |
| 3,416,632 | 12/1968 | Bodine et al. | 340/17 |
| 3,884,324 | 5/1975 | Hamilton et al. | 181/121 |

OTHER PUBLICATIONS

Barbier, "Sosie, A New Method", 11/12/70, pp. 1–23, 40th Annual International S.E.G.

Primary Examiner—Nelson Moskowitz
Attorney, Agent, or Firm—Bacon & Thomas

[57] ABSTRACT

A device for generating sound waves for use in shallow terristrial seismology incorporates a percussion mass, a motor for driving the percussion mass to strike the ground for intermittent contact and adjustable to vary the frequency of impact, and a sensing element to provide a signal indicative of at least the instant of impact and preferably also the deceleration amplitude of impact.

14 Claims, 5 Drawing Figures

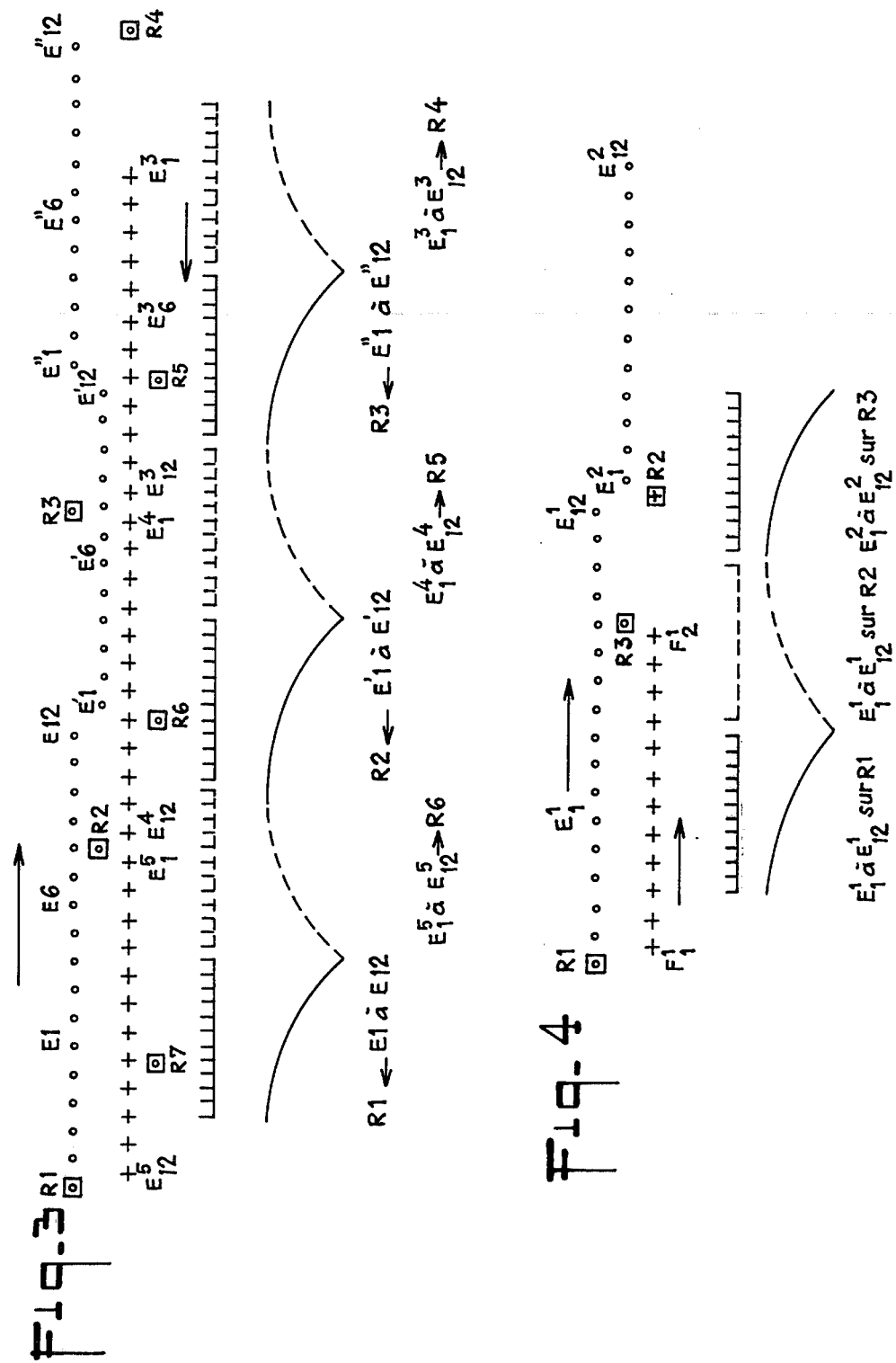

DEVICE FOR PRODUCING MECHANICAL WAVES

The subject of the present invention is a device for producing mechanical waves which can be used especially in shallow terrestrial seismology.

Attempts are increasingly being made to apply seismic prospecting methods to gaining information about ground in which the strata lying at shallow depths are those of interest. This is particularly desirable, for example, in mining research and civil engineering.

Traditional terrestrial seismology using devices based on explosives or dropping weights, as the means for generating mechanical waves in the ground to be explored, are unable to give complete satisfaction.

In fact, traditional terrestrial seismology was developed in order to learn about the nature of the various geological strata lying at great depths. Consequently, the sound wave generating means employed are too powerful, taking into account the result to be achieved. Moreover, the waves reflected from the surface, which generally constitute the "noise" accompanying the waves refracted and reflected by the deep strata, are traditionally removed at the time of treating the signals from the receivers or geophones.

Attempts have been made to develop the weight-dropping technique because it is easier to master. Thus it has been proposed to use, as a source for producing mechanical waves, a hammer striking a plate placed on the ground. However, in that case, only a slight shock is produced and so it is not possible to exceed a certain distance, which is of the order of 80 meters, between the transmitter and the receiver.

Moreover, it must be noted that no matter what the sound wave generating devices may be, they are rather difficult to handle and, because of their bulk, cannot be very rapidly transported from one point to another on the ground to be explored; this would lead to prohibitively high costs per kilometer of ground explored.

However, terrestrial or marine seismic exploration processes can be applied to shallow terrestrial seismology for civil engineering purposes. In particular it is possible to use the process known by the name of "SOSIE", which consists of transmitting trains of pulses of substantially constant amplitude, in which the period elapsing between any two successive pulses from one and the same source is less than the time taken for reflection to occur from the deepest stratum of interest.

This is the reason why it is desirable to produce a device which generates mechanical waves for use in shallow terrestrial seismology and, where appropriate, in the SOSIE process indicated above; however all seismic prospecting processes require such a source.

It is an object of the present invention to provide a device for producing mechanical waves which is of small overall size and so is very easy to handle, and is reliable. It is also desirable for the amplitude of the waves to be measured during transmission.

According to the present invention we provide a device for producing mechanical waves, comprising a percussion mass adapted to strike the ground for intermittent contact at a frequency of between 0.5 Hz and 100 Hz, means for varying the frequency of impact during the period of transmission of the mechanical waves generated in the ground to be explored by the impacts, and a sensing element to provide a signal which is representative at least of the instants of impact.

Preferably the signal from the sensing element is representative of both the deceleration amplitude and the instant of impact.

In order that the present invention may more readily be understood, the following description is given merely by way of example, with reference to the accompanying drawings in which:

FIG. 1a represents a cross-sectional view of the sensing element;

FIGS. 3 and 4 are diagrams illustrating the way in which the device is used.

Figure 1:
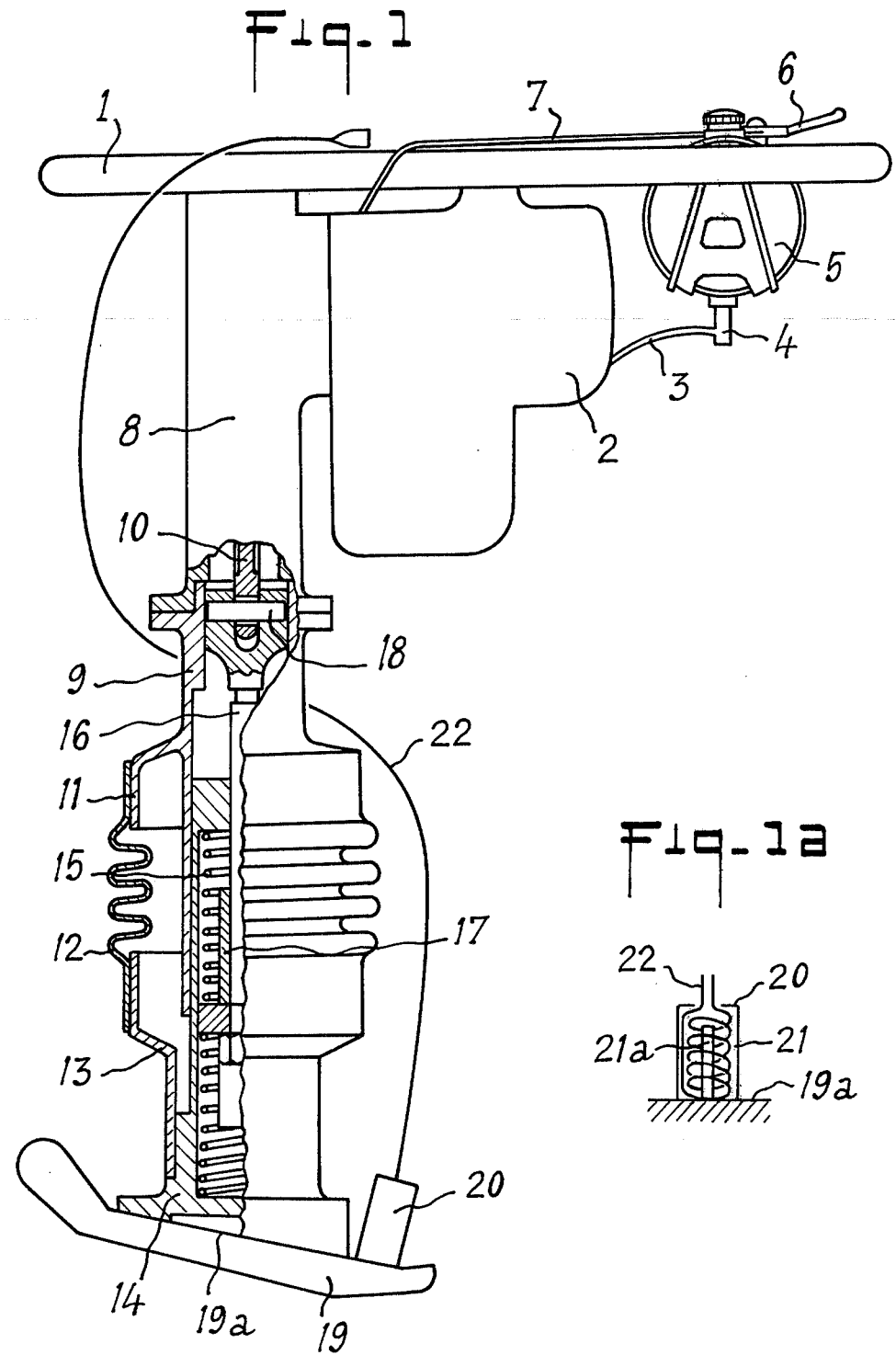
FIG. 1 is a partial cross-sectional view of one embodiment of a device according to the invention.

The device represented in FIGS. 1 and 1a comprises a vibrating frame 1 firmly fixed to the components necessary to effect vibration such as a rotary internal combustion motor 2 supplied with fuel through a pipeline 3 connected via a cock 4 to a reservoir 5, acceleration or deceleration of the motor 2 being effected by means of a throttlelever 6 and a transmission cable 7 in order to vary the frequency of impact of the percussion mass on the ground.

A body 8 is connected on the one hand to the frame 1 and on the other hand to a guide cylinder 9, the said body 8 being intended to enclose a connecting rod and crank assembly of the motor 2; only the connecting rod 10 can be seen in FIG. 1. The guide cylinder 9 comprises a circular skirt 11 which is connected via bellows 12 to another circular skirt 13 firmly fixed to a spring cylinder 14. The spring cylinder 14 encloses a guide piston 16 which slides inside a casing 17 and is coupled to the connecting rod 10 via a spindle 18. A vibrating spring 15 surrounding the casing 17 and provided inside the spring cylinder 14 serves to resist sliding of the piston 16 relative to the guide cylinder 9 and the spring cylinder 14.

A percussion mass in the form of a striking head 19, of suitable shape for striking the ground in a suitable manner, is mounted at the lower end of the spring cylinder 14. At least one electromagnetic sensing element 20, consisting of a coil 21 and a soft iron core 21a, and capable of providing a signal at each impact of the striking head 19, is mounted on the striking head 19, preferably perpendicular to the support face 19a.

When the striking head is made to vibrate at a frequency of between 0.5 Hz and 100 Hz, and preferably between 1 and 35 Hz, the signals produced by the sensing element and transmitted via the electrically conducting wire 22 are shaped in a circuit 23 before being conveyed simultaneously to a computer 24 of the "SOSIE" type, for example similar to that described in French Pat. No. 2,068,147, and to a monitoring oscilloscope 25.

The purpose of this shaping operation is to convert each of the signals delivered during each impact into a single pulse of given amplitude, the pulse width of which is less than twice the value of a sampling range defined later, the said pulse being a measure of the precise moment of impact. It is obvious that the signals coming from the sensing element 20 can be applied directly to the shaping circuit 23 or can pass in transit through a transmitting-receiving radio 26, 27. The latter arrangement makes it possible to separate the percussion device from the processing means which will remain fixed no matter what the path followed by the percussion device may be, thus making it possible to reduce the length of the conducting wire 22 and to prevent it from executing movements which would have an adverse effect on the satisfactory transmission of the signals emitted by the sensing element 20.

Other signals received on a receiving component 28 such as a geophone and produced by reflections and refractions of the signals emitted in the various strata of the ground to be explored are also applied to the input of the "SOSIE" computer, and are passed first through an analogue amplifier 29, in which they are filtered and amplified, before being applied to the computer 24.

Figure 2:
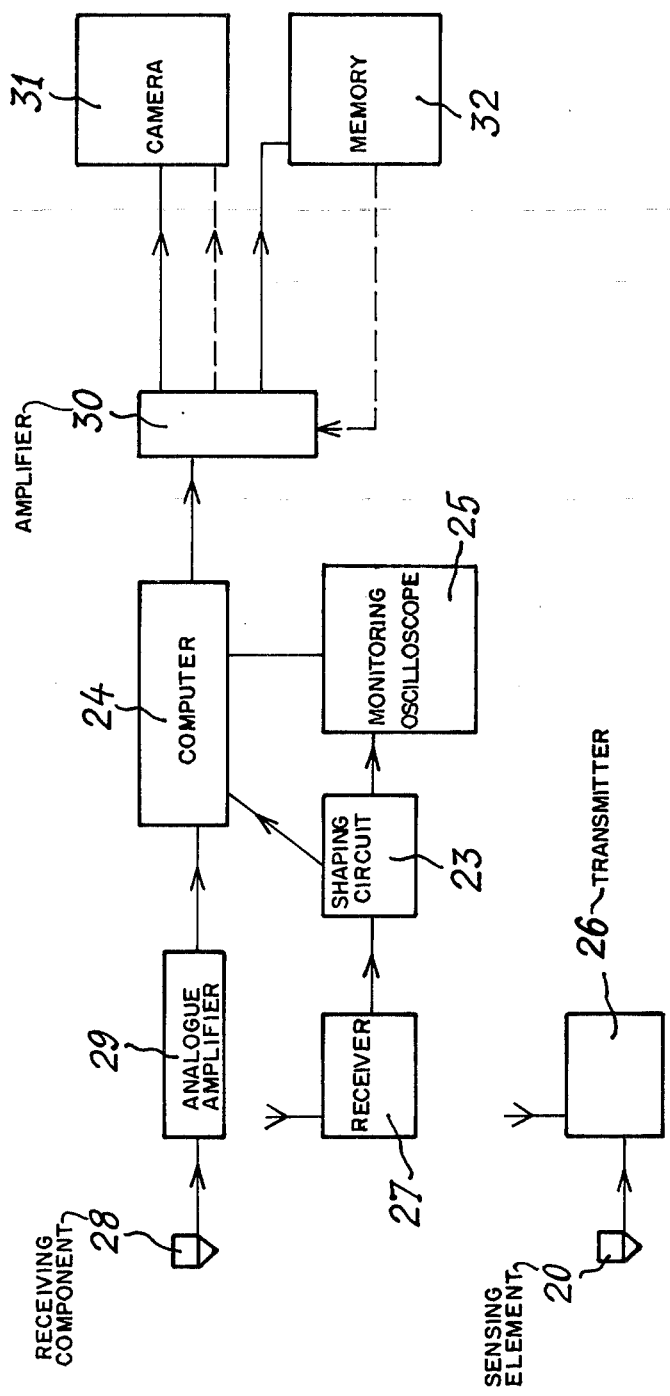
FIG. 2 is a block diagram of the signal processing means.

The seismic signals which come from the receiving component 28 and which are introduced into the computer are counted within the sampling range of 0.5, 1, 2 or 4 milli-seconds and the "SOSIE" treatment described in French Pat. No. 1,583,239 takes place using, as the reference, the signals from the sensing element 20 which have been shaped as indicated above representing the moments of emission, that is to say the moments at which the striking head actually strikes the ground to be explored. After a given period of transmission, generally 30 to 60 seconds, the operation is stopped and the data are ready to be conveyed to a single-track camera 31, which serves to render the results visible, through an amplifier 30 and/or to a magnetic memory 32 intended to store the results (see FIG. 2).

It is possible to take account of the amplitudes of the signals delivered by the sensing element 20 to indicate the magnitude of the deceleration on impact to measure the wave amplitude. Each of the signals delivered during each impact is converted into a single pulse, the amplitude of which is a function of the amplitude of the signal delivered by the sensing element and the pulse width of which is less than twice the value of the sampling range, defined above, the said pulse providing a measure simultaneously of the precise instant of the pulse and of the amplitude of the corresponding impact on the ground.

The succession of signal pulses from the sensing element 20 as well as the seismic signals coming from the receiving component or geophone 28 are introduced into a numerical correlating device which carries out the function of inter-correlating the seismic signals received and the succession of pulses.

Since the possibilities for carrying out the process depend on the number of transmitting sources or sensing elements and on the number of receivers which are available, and are also a function of the result sought, only one method for carrying out the process will be given below. This exemplified method is carried out with single-track equipment and consists of keeping the receiver fixed whilst the transmitting source tracks over a given distance, thus causing the distance between the source and the receiver to vary, this method of working making it possible to distinguish, by means of apparent speeds and indicator curves, between what is organised noise, refracted inputs or reflected inputs.

In FIG. 3, the starting position corresponds to positioning the receivers at $R_1$ and the transmitting source at $E_1$. The distance $R_1E_1$ represents the minimum separation. Thereafter, the transmitting source tracks along the exploration line with the striking head 19 to the position $E_{12}$ which represents the maximum separation, taking into account the depth from which the information is sought. By travelling with the source from $E_1$ to $E_{12}$ and maintaining the receivers at $R_1$, a recording of 12 points is obtained giving the curve indicated in continuous lines.

The next series of measurements will be made by going from $E'_1$ to $E'_{12}$ with the receivers at $R_2$, then from $E''_1$ to $E''_{12}$ with the receivers at $R_3$, and so on. It is seen that, in this way, the curves are always in the same direction, and that there are as many full segments as empty broken line segments.

In order to plot these broken line segments the path of the wave source will be retraced and transmission will be effected successively from $E^3_1$ to $E^3_{12}$, then $E^4_1$ to $E^4_{12}$, and so on, and recording will be effected respectively on the receivers $R^4$, $R^5$ and so on. The point from which the path will be retraced is in principle the end of the profile, and, when recording on a camera, it will be necessary to take into account the broken line profile segments which are plotted subsequently.

This method of working is the only one which, using single-track equipment and a single source, makes it possible to move the source forwards continuously, without having to effect useless changes in position.

For the purpose of having a continuous mirror-image coverage without having to make the source retrace its tracks, it is possible to use two transmission sources E and F which will be employed one after the other by the same assistant. FIG. 4 represents the successive positions of the two sources and of the receivers. When the percussion device has been tracked from the position $E^1_1$ to the position $E^1_{12}$, while recording with the receivers at position $R_1$, it is left in position and a second percussion device is used and is tracked from $F^1_1$ to $F^1_{12}$ while recording with the receiver at $R_2$. Thereafter, the first percussion device is moved again from $E^2_1$ to $E^2_{12}$ while recording with the receivers at $R_3$, and so on. This procedure will result in a great saving of time.

As has been stated above, the transmission device according to the invention can be used advantageously as a source for transmitting mechanical waves in the seismic exploration processes developed by Societe Nationale des Petroles Aquitaine and known by the name "SOSIE," the said processes being especially described in French Pat. No. 1,583,239 (using a single transmission source) and its Certificate of Addition No. 2,142,122 (using several transmission sources) as well as in French Pat. No. 2,123,839.

The device described above can be applied not only to the seismic prospecting method called "SOSIE", but also to other methods where the instants of transmission are recorded. Likewise, the device can be used by keeping the distance between the transmitters and the receivers constant, in a manner similar to a method of exploration used in marine seismology.

In the above description, the sensing element 20 is mounted directly on the striking head 19. However, it is also possible to consider the case where the sensing element is placed on a plate which is positioned on the ground and which is struck by the striking head. It is also possible to place the sensing element 20 directly on the ground, subject to the condition that, for the entire duration of a transmission operation, the distance between the striking head and the sensing element should remain substantially constant.

I claim:

1. A seismological apparatus for generating terristrial compressions having variable time intervals therebetween comprising:

a. a percussion mass, b. means for driving said percussion mass to strike a ground surface intermittently thereby causing impacts at a repetition rate in the range of 0.5 to 100 Hz,
c. said impacts being terrestrially transmitted as waves of compression,
d. means for varying the repetition rate of said impacts, said means operable during the intervals between said impacts, and
e. first sensing means for providing a signal representing times of occurrences of said impacts.

2. A seismological apparatus as defined in claim 1, further comprising second sensing means for providing an output signal responsive to said terrestrially transmitted waves of compression.

3. A seismological apparatus as defined in claim 2 further comprising means for correlating said signals from said first and said second sensing means.

4. A seismological apparatus as defined in claim 3 wherein said correlating means comprises:
a. means for filtering and amplifying said second sensing means output signal,
b. means for converting said signals from said first sensing means to pulses marking occurrences of said impacts,
c. numerical correlating means for analyzing said second sensing means output signal using said pulses as references for said analyzing means,
d. means for conveying an output signal of said numerical correlating means to a utilizing device.

5. A seismological apparatus as defined in claim 4 wherein said utilizing device comprises means for providing a visible form of said correlating means output signal.

6. A seismological apparatus as defined in claim 4 wherein said utilizing device comprises storage means for retaining said output signal of said correlating means.

7. A seismological apparatus as defined in claim 4 wherein said pulses have amplitudes representative of amplitudes of said impacts.

8. A device as defined in claim 1, wherein said first sensing means further provides a signal indicative of amplitudes of said impacts.

9. A device as defined in claim 1, wherein said driving means drives the percussion mass at a repetition rate of 1 to 35 Hz.

10. A device as defined in claim 1, wherein said first sensing means is carried by said percussion mass.

11. A device as defined in claim 1, and further including a plate carried by said percussion mass and disposed to be interposed between the ground and the mass.

12. A device as defined in claim 11, wherein said first sensing means is carried on said plate.

13. A device as defined in claim 1, wherein said first sensing means is adapted to be placed directly on the ground at a distance from the percussion mass which remains substantially constant.

14. A device as defined in claim 1, and further including a receiver, and means for processing the output signals from the receiver.

* * * * *